US011048972B2

(12) United States Patent
Liu et al.

(10) Patent No.: US 11,048,972 B2
(45) Date of Patent: Jun. 29, 2021

(54) MACHINE LEARNING BASED SYSTEM FOR IDENTIFYING RESONATED CONNECTIONS IN ONLINE CONNECTION NETWORKS

(71) Applicant: Microsoft Technology Licensing, LLC, Redmond, WA (US)

(72) Inventors: Yan Liu, Sunnyvale, CA (US); Ajita Thomas, Sunnyvale, CA (US); Alexander Shoykhet, Belmont, CA (US); Bing Wang, Mountain View, CA (US); Ying Xi, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 16/447,817

(22) Filed: Jun. 20, 2019

(65) Prior Publication Data

US 2020/0401848 A1  Dec. 24, 2020

(51) Int. Cl.
*G06K 9/62* (2006.01)
*G06N 20/00* (2019.01)
*H04L 29/08* (2006.01)

(52) U.S. Cl.
CPC ........... *G06K 9/6256* (2013.01); *G06N 20/00* (2019.01); *H04L 67/14* (2013.01); *H04L 67/22* (2013.01); *H04L 67/306* (2013.01)

(58) Field of Classification Search
CPC ........... G06F 16/24575; G06F 16/9024; G06F 16/9535; G06F 7/20; G06K 9/6256; G06N 20/00; H04L 67/14; H04L 67/22; H04L 67/306; G06Q 30/0202; G06Q 10/1053
See application file for complete search history.

(56) References Cited

U.S. PATENT DOCUMENTS

2014/0126708 A1* 5/2014 Sayko ..................... H04L 67/22
 379/93.01
2018/0253189 A1* 9/2018 Jain ....................... G06F 3/0481

* cited by examiner

*Primary Examiner* — Soe Hlaing
(74) *Attorney, Agent, or Firm* — Schwegman Lundberg & Woessner, P.A.

(57) ABSTRACT

The technical problem of identifying relevant social proof information with respect to a premium service for a given member profile in an online connection network system is addressed by, first, capturing the associated member's intent based on the member's activity on the web site provided by the online connection network system. The determined intent is used as input into a relevance machine learning model that is executed to identify the member's connection who is a subscriber to the premium service and who has been identified as the most convincing resonated connection of the member with respect to subscribing to the premium service.

20 Claims, 5 Drawing Sheets

MACHINE LEARNING BASED SYSTEM FOR IDENTIFYING RESONATED CONNECTIONS IN ONLINE CONNECTION NETWORKS

TECHNICAL FIELD

This application relates to the technical fields of software and/or hardware technology and, in one example embodiment, to machine learning based method for identifying resonated connections.

BACKGROUND

An online connection network system is a platform for connecting people in virtual space. An online connection network system may be a web-based platform, such as, e.g., a connection networking web site, and may be accessed by a user via a web browser or via a mobile application provided on a mobile phone, a tablet, etc. An online connection network system may be a business-focused connection network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a connection networking web site may emphasize employment history and professional skills of the associated member. Any two members may indicate their mutual willingness to be "connected" in the context of the online connection network system, in that they can view each other's profiles, profile recommendations and endorsements for each other and otherwise be in touch via the online connection network system. Members who are connected in the context of an online connection network system may be termed each other's "connections" and their respective profiles are associated with respective connection links indicative of these two profiles being connected.

An online connection network system is also designed to allow job posters (e.g., companies) to post job openings such that the job openings (also referred to as simply jobs) can be surfaced to members, e.g., as search results in response to a search submitted by a member to the online connection network system or as recommendations that can appear in a member's news feed. Recommended jobs are presented to a member via a user interface that permits the member to view the details of the job and also to apply to the job electronically.

A provider of an online connection network system may offer users access to basic features of the service free of charge, but require a for-fee subscription to a premium service—a version of the service that includes additional or enhanced features. A user may be presented with a message briefly describing an enhanced version of the service. The user may choose to purchase the offered premium subscription or decline to do so and continue to use the free version of the service. The current and on-going challenge for on-line services is to promote premium subscriptions effectively.

Social proof is the idea that consumers will adapt their behavior according to what other people are doing. It has been widely used in marketing as it is one of the most powerful tools. Among all types of social proofs, user social proof is to share users' successful stories with other users. For example, "Wisdom of your Friends" social proof is considered to be one of the most effective user social proof techniques, which leverages recommendations that come from people that the user knows and trusts.

BRIEF DESCRIPTION OF DRAWINGS

Embodiments of the present invention are illustrated by way of example and not limitation in the figures of the accompanying drawings, in which like reference numbers indicate similar elements and in which.

OVERVIEW

Figure 1:
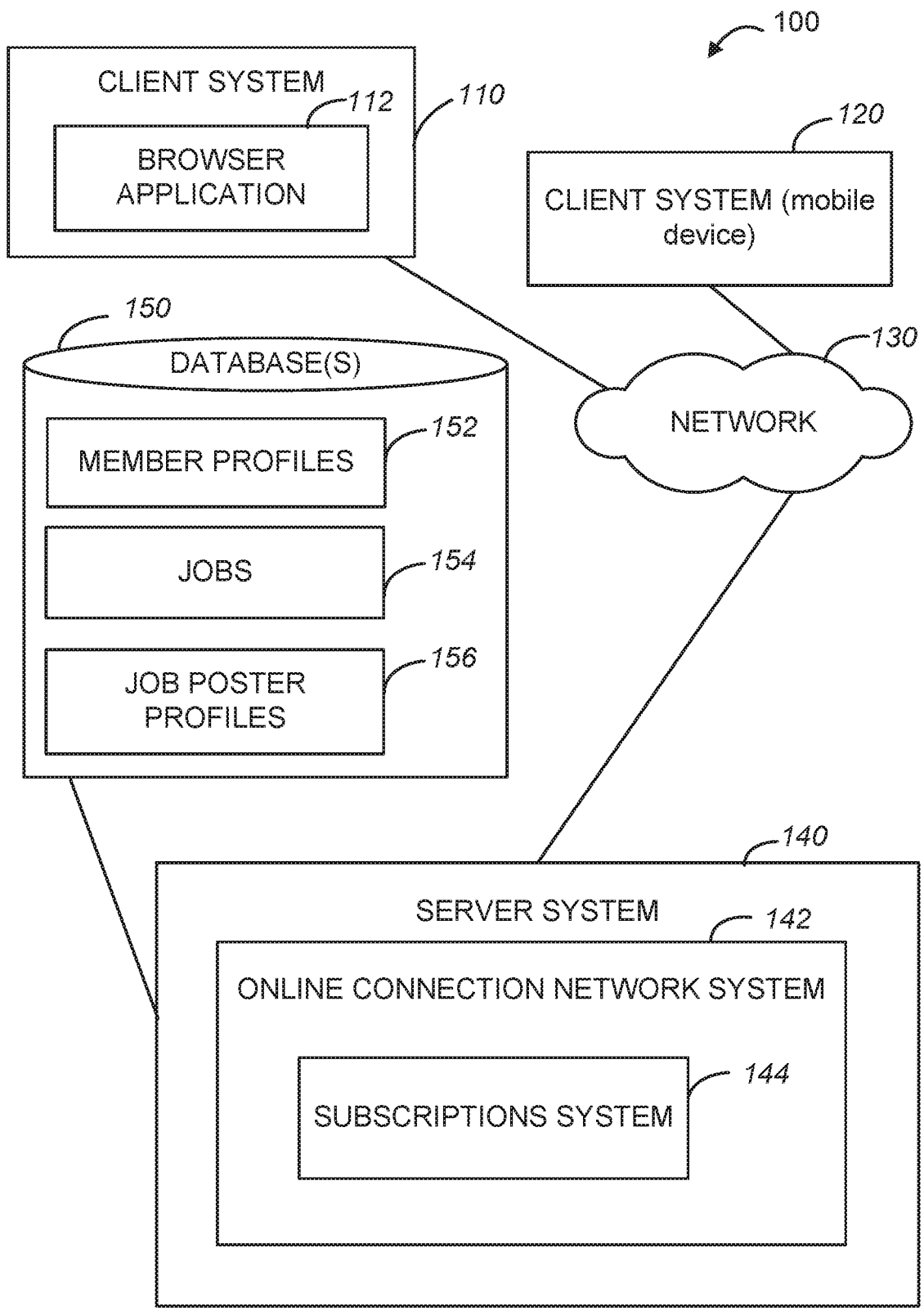
FIG. 1 is a diagrammatic representation of a network environment within which an example machine learning based method for identifying resonated connections may be implemented.

A machine learning based method for identifying resonated connections in online connection networks are described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrases "an online connection networking application" and "an online connection network system" may be referred to as and used interchangeably with the phrase "an online connection network" or merely "a connection network." It will also be noted that an online connection network may be any type of an online connection network, such as, e.g., a professional network, an interest-based network, or any online networking system that permits users to join as registered members. A member is represented in an online connection network system by a member profile that may include various information such as, e.g., the name of a member, current and previous geographic location of a member, current and previous employment information of a member, information related to education of a member, information about professional accomplishments of a member, publications, patents, as well as information about the member's professional skills. Each member of an online connection network is represented by a member profile (also referred to as a profile of a member or simply a profile). As mentioned above, an online connection network system may be designed to allow registered members to establish and document networks of people they know and trust professionally. Any two members may indicate their mutual willingness to be "connected" in the context of the online connection network system, in that they can view each other's profiles, profile recommendations and endorsements for each other and otherwise be in touch via the online connection network system. Members who are connected in the context of an online connection network system may be termed each other's "connections" and their respective profiles are associated with respective connection links indicative of these two profiles being connected.

A mentioned above, a provider of online connection network system may offer users access to basic features of the service free of charge but require a for-fee subscription to a version of the service that includes additional or enhanced features. These features, e.g., the ability to direct message to recruiters or to be able to retrieve a greater number of search results than that offered by the free version of the service may be particularly useful to certain members, such as for those actively looking for a job or for those working as recruiters. A component provided with the online connection service responsible for promoting for-fee subscriptions also referred to as premium subscriptions or services) is a subscriptions system. The subscriptions system is configured to present a member with information about a premium service, which may be done at the time when the member's interaction with the online connection network system indicates potential interest in a premium service. For example, a member may search for jobs with certain frequency and intensity, or search for member profiles that include a certain set of skills, etc., which the subscription system may interpret as an indication that the member would benefit from features provided by the premium service that allow users to direct message to recruiters or permit them to compare their profile to profiles of other job candidates. The subscription system may then present to the member a UI with information about the premium service.

As mentioned above, social proof can be used as a powerful marketing tool. In the context of promoting premium services in an online connection network system, the technical problem is how to automatically identify the most resonating information for a given member profile. For the purposes of this description, the most resonating information is a member profile connected to the given member profile, where the connected member has been identified as a convincing reference with respect to recommending the member premium services. A further technical problem is discerning the intent of a member, to whom the premium service is to be recommended. One challenge, for example, lies in that the same member may engage with the online connection network system for several different purposes. For instance, a member who is identified as a recruiter in their job title field of the associated member profile may be searching for qualified candidates for job positions at one time, while at other times the same member may be searching for a job for themselves. These two different intents—recruiting and job search—may matter a great deal when selecting a connected member profile as social proof, i.e., as the most resonating connection. For example, if a member is searching for a job, it would hardly be effective to point out to them that one of their connections is successfully using premium services for recruiting purposes.

In some embodiments, the technical problem of identifying the most resonating information for a given member profile with respect to premium services is addressed by capturing a member's intent based on the member's activity on the web site provided by the online connection network system, using a machine learning model (termed member intent model for the purposes of this description). The member intent model is trained using previously observed behavior data of members of the online connection network system. The intent model outputs an intent of a user. The representation of the intent can be an ID which maps to a real intent such as but no limited to job seeking intent, network expansion intent, sales intent or recruiting intent, etc.

The intent determined by executing the intent machine learning model is used as input into another machine learning model, termed relevance model for the purposes of this description. With respect to a given member profile (termed a subject member profile since it is the subject for which most relevant resonated connections are being determined), the relevance model generates scores for member profiles that are connected to the given member profile. These scores—relevance values—represent the likelihood that the member would subscribe to the recommended premium service if presented with a message that the associated connection is already a subscriber to that premium service.

Figure 5:
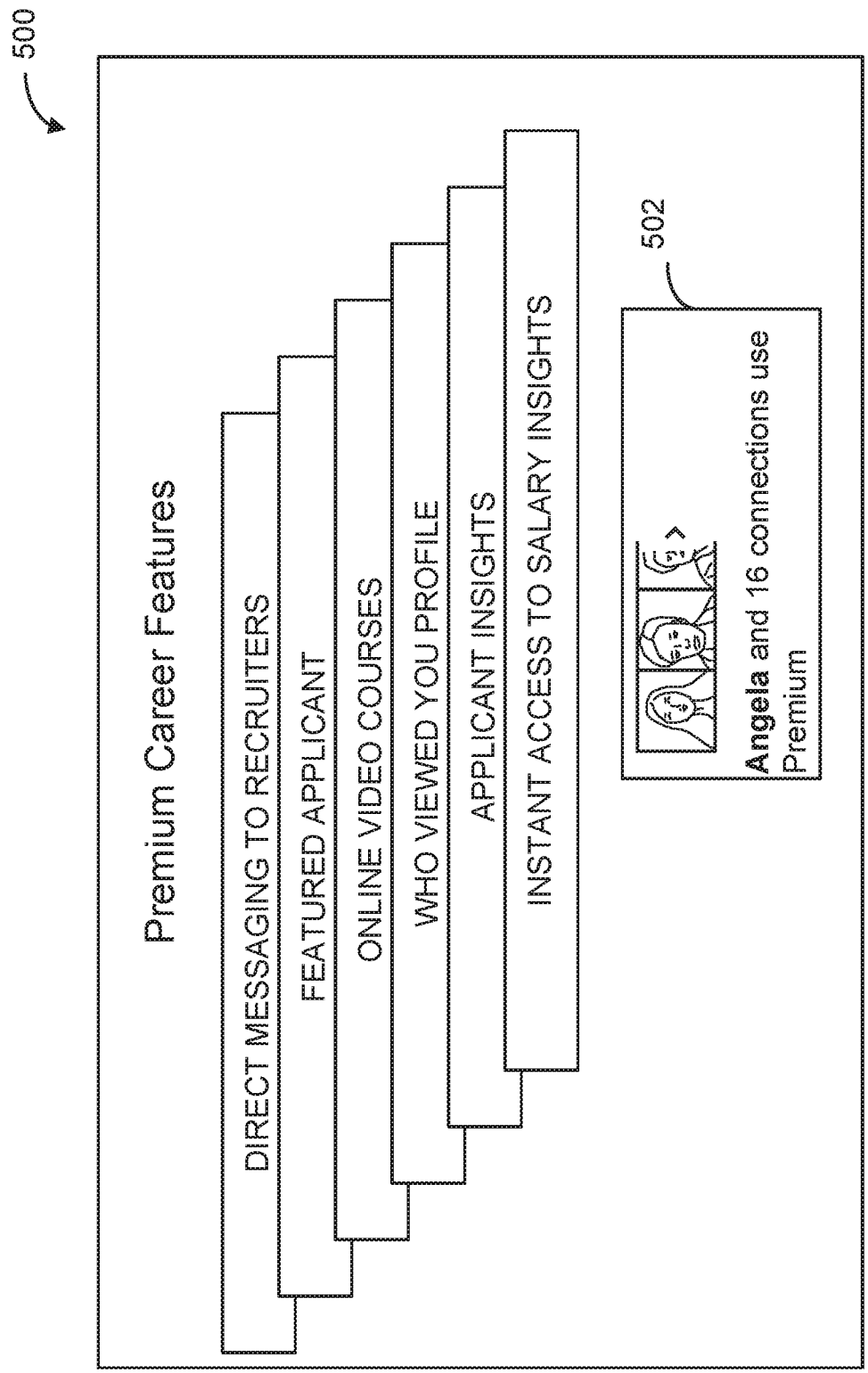
FIG. 5 is a diagrammatic representation of an example user interface (UI) that includes a description of features provided with a premium subscription and also includes a UI element that references the most resonating connection selected for the subject member profile.

From the connections of the subject member profile, the subscription system selects at least one member profile (i.e., at least one resonated connection) based on the respective relevance values and also based on the member's near line browsing behavior on the connection networking service web site, and presents a reference to that resonated connection to the subject member on the same screen as the description of the premium services, as shown in FIG. 5. FIG. 5 illustrates an example UI 500 that includes a description of features provided with the premium subscription and also includes a UI element 502 that references the resonated connection selected for the subject member profile, as the one most likely to convince the member represented by the subject member profile that the recommended premium service would be of value to them.

DETAILED DESCRIPTION

An example subscriptions system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an online connection network system 142. As explained above, each member of an online connection network is represented by a member profile that contains personal and professional information about the member and that may be associated with connection links that indicate the member's connection to other member profiles in the online connection network. Member profiles and related information may be stored in a database 150 as member profiles 152. The database 150 also stores other entities, such as jobs 154 and job poster profiles 156.

The client systems 110 and 120 can access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in 1, the server system 140 also hosts a subscriptions system 144. The subscriptions system 144 is configured to perform the machine learning based method for identifying resonated connections in online connection networks, by applying methodologies discussed herein. Example architecture of the subscriptions system 144 is illustrated in FIG. 2.

Figure 2:
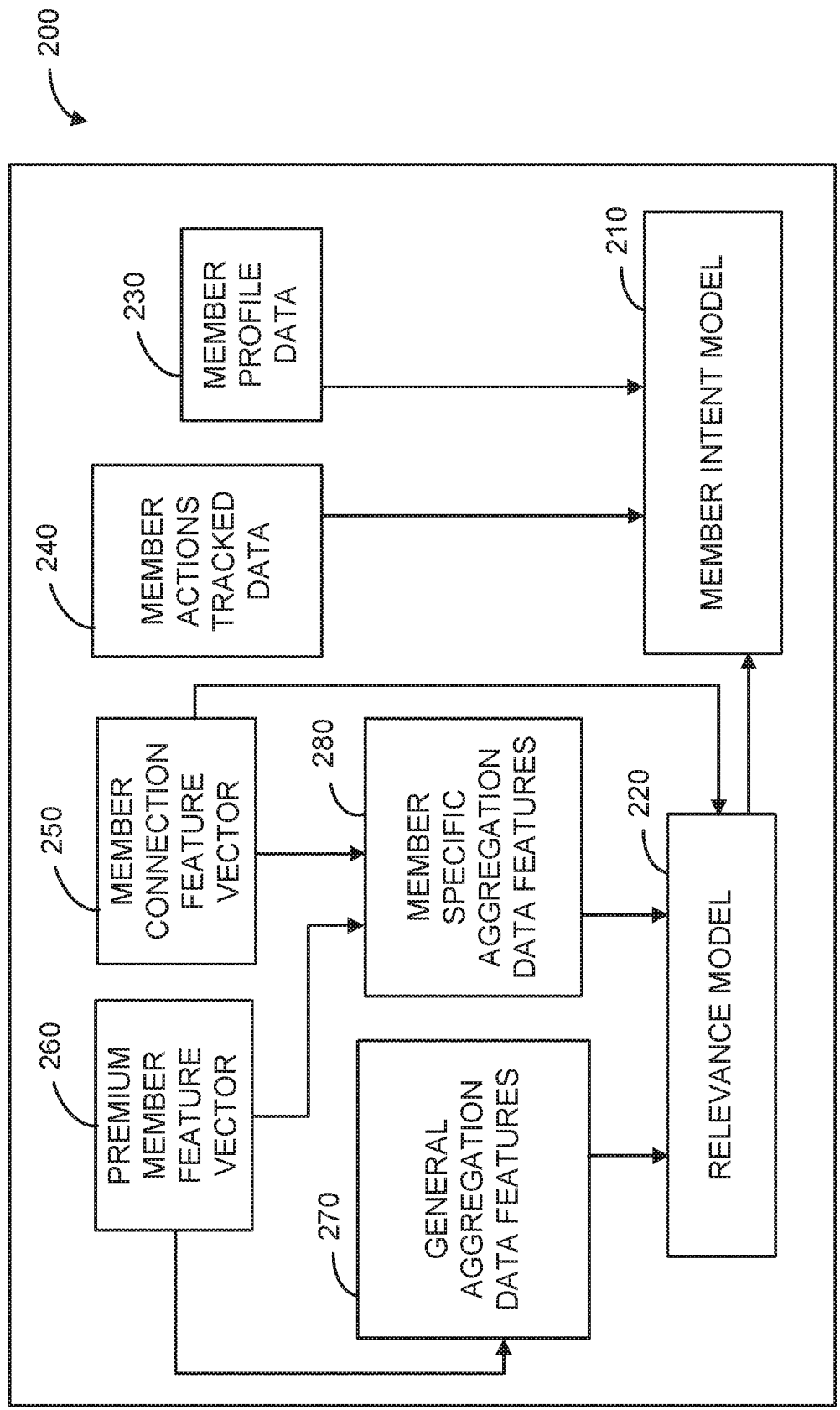
FIG. 2 is a block diagram of an architecture for machine learning based method for identifying resonated connections, in accordance with one example embodiment.

FIG. 2 is a block diagram of an architecture 200 used by the subscriptions system 144 of FIG. 1 for multi-objective optimization of job applications redistribution in an online connection network. As shown in FIG. 2, the architecture 200 includes at least two machine learning models—a member intent model 210 and a relevance model 220. As explained above, the member intent model 210 is trained using previously observed behavior data of members of the online connection network system 142. In some embodiments, the member intent model 210 uses neural networks machine learning algorithms. The member intent model 210 takes, as input, information about the subject member (the member for whom resonated connections information is being generated)—member profile data 230 and member actions tracked data 240. The member profile data 230 includes information submitted to the online connection network system 142 by the subject member (e.g., the subject member's job title, education information), information submitted to the online connection network system 142 by the subject member's connections (e.g., endorsements with respect to the subject member's skills), as well as information derived from the submitted data (e.g., subject member's professional seniority, their status as an influencer, etc.). The member actions tracked data 240 includes information tracked by the online connection network system 142 with respect to the member's interactions with the associated web site, such as, e.g., the average number of job searched performed by the member during a period of time, the average number of job applications, the average number of connection requests, the average number of direct messages sent and responded to, etc. The member profile data 230 and the member actions tracked data 240 with respect to members at large in the online connection network system 142 or with respect to a certain segment of members in the online connection network system 142 is used to train the member intent model 210.

The relevance model 220 takes, as input, the output of the member intent model 210 (the subject member's intent), information about the subject member's connections (a member connection feature vector 250), as well as member specific aggregation data features 280 and general aggregation data features 270. The member connection feature vector 250 includes information such as how long the subject member has been connected to respective connections, respective interactions between the subject member and their connections, etc.

The premium member feature vector 260 includes information about each connection of the subject member profile, such as whether they subscribe to the premium service or not, the count of profile views by the subject member, number of direct messages with the subject member, how soon they found a job using premium services, the average tenure, the average promotion time, etc. The member specific aggregation data features 280 are derived from the member connection feature vector 250 and a premium member feature vector 260 and include features, such as the counts of the subject member's connections by domain, the number of the subject member's connections that subscribe to premium services (termed premium connections for the purposes of this description), respective numbers of the subject member's connections by job title, etc. A domain can be a geolocation such as San Francisco Bay Area, or a professional title such as Software Engineer, or a specific industry such as Marketing/Sales/Legal. The idea of domain is to limit the computation into a smaller subset.

The general aggregation data features 270 are derived from the premium member feature vector 260 and include information such as, e.g., how long does it take on average for a subscriber to premium service to find a job in a certain industry.

The member connection feature vector 250, the premium member feature vector 260, the member specific aggregation data features 280 and the general aggregation data features 270 with respect to members at large in the online connection network system 142 or with respect to a certain segment of members in the online connection network system 142 are used to train the relevance model 220. In some embodiments, the relevance model 220 uses neural networks machine learning algorithms.

Some operations performed by the subscriptions system 144 may be described with reference to FIG. 3.

Figure 3:
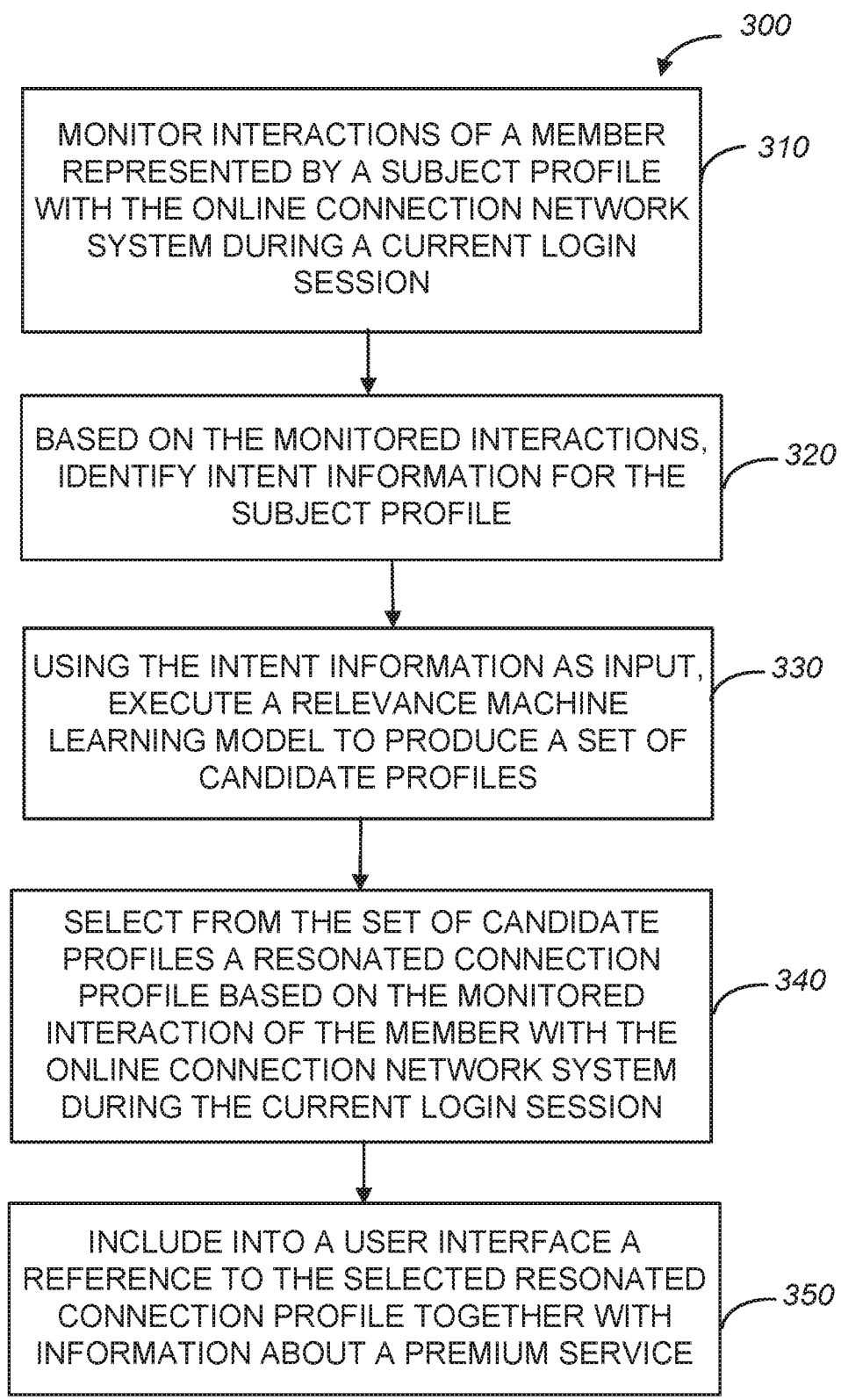
FIG. 3 is a flowchart illustrating machine learning based method for identifying resonated connections, in accordance with an example embodiment.

FIG. 3 is a flowchart of a method 300 for multi-objective optimization of job applications redistribution in an online connection network 142 of FIG. 1. The method 300 may be performed by processing logic that may comprise hardware (e.g., dedicated logic, programmable logic, microcode, etc.), software, or a combination of both. In one example embodiment, the processing logic resides at the server system 140 of FIG. 1.

As shown in FIG. 3, the method 300 commences at operation 310, with monitoring interactions of the member with the online connection network system during a current login session of the member in the online connection network system. The member is represented by a subject profile in the online connection network system. At operation 320, based on the monitored interactions of the member with the online connection network system during the current login session, intent information for the subject profile is identified. The intent information may indicate indicates a job search in the online connection network system, recruiting professionals for job positions, searching for online educational courses, etc. The process of identifying the intent information may include identifying a subdomain of the intent information. For example, when the intent information is indicative of a job search, the associated subdomain information may be indicative of the job search being characterized by changing industries or by searching for a lateral change in a different geographic location, or by searching for a higher level position, etc.

The intent information for the subject profile is identified by executing an intent machine learning model, using, as input, the monitored interactions of the member with the online connection network system during the current login session. The intent machine learning model may be trained using, as training data, previously tracked activity of members in the online connection network system (members' behavior data). At operation 330, the intent information, together with data derived from the subject profile and together with data derived from the profiles connected to the subject profile, is used as input into a relevance machine learning model. The relevance machine learning model is executed to produce a set of candidate profiles from the connected profiles. The relevance machine learning model assigns to each profile in the set of candidate profiles an associated relevance value. The relevance value assigned to a profile is generated based, in part on connection strength between the profile and the subject profile and represent the likelihood that the member would subscribe to the recommended premium service if presented with a message that the associated connection is already a subscriber to that premium service. The input into the relevance machine learning model is the intent information, data produced by tracking and storing information related to interactions between the member and the member's connections in the online connection network system and data produced by tracking and storing information related to the member's connections and their respective status as subscribers to the premium service.

At operation 340, a resonated connection profile is selected from the set of candidate profiles, based on the monitored interaction of the member with the online connection network system during the current login session. The monitored interaction of the member with the online connection network system during the current login session may be referred to as near-line member browsing behavior data. The resonated connection profile selection is the result of executing the relevance machine learning model.

The relevance machine learning model is trained using previously tracked and stored information related to interactions, in the online connection network system, between members of the online connection network system and their respective connections and also previously tracked and stored information related to behavior, in the online connection network system, of members of the online connection network system that are subscribers to the premium service.

At operation 350, a reference to the selected resonated connection profile is included into a UI as social proof with respect to a premium service provided by the online connection network system. The UI is then presented on a display device associated with the member represented by the subject profile. An example UI that includes a reference to the selected resonated connection profile is included into a UI as social proof with respect to a premium service provided by the online connection network system is shown in FIG. 5.

Figure 4:
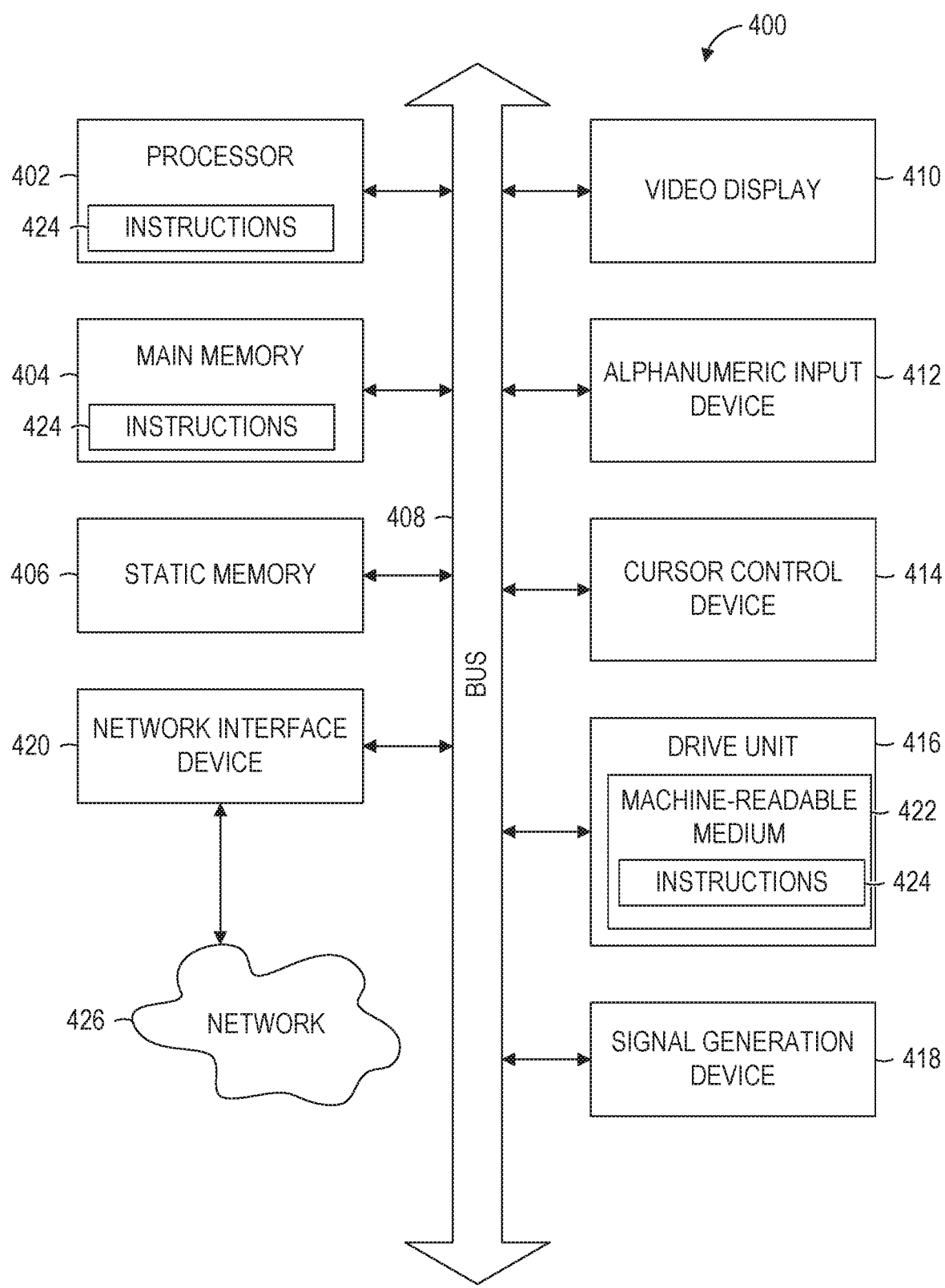
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only, memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible thing, be that a thing that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system for machine learning based method for identifying resonated connections in online connection networks has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
maintaining member profiles in an online connection network system, the member profiles including a subject profile representing a member in the online connection network system, the subject profile associated with connected profiles from the member profiles;
monitoring interactions of the member with the online connection network system during a current login session of the member in the online connection network system;
based on the monitored interactions of the member with the online connection network system during the current login session, identifying intent information for the subject profile;
using the intent information, together with data derived from the subject profile, and with data derived from the connected profiles as input into a relevance machine learning model, executing the relevance machine learning model to produce a set of candidate profiles from the connected profiles, each profile from the set of candidate profiles having an associated relevance value indicating connection strength between the profile and the subject profile;
selecting from the set of candidate profiles a resonated connection profile based on the monitored interaction of the member with the online connection network system during the current login session; and
including into a user interface a reference to the selected resonated connection profile together with information about a premium service provided by the online connection network system.

2. The method of claim 1, wherein the identifying of the intent information for the subject profile comprises executing an intent machine learning model, using, as input, the monitored interactions of the member with the online connection network system during the current login session.

3. The method of claim 2, comprising:
tracking and storing activity of members in the online connection network system to generate members' behavior data; and
training the intent machine learning model using the members' behavior data.

4. The method of claim 1, comprising causing presentation of the user interface on a display device associated with the member represented by the subject profile.

5. The method of claim 1, wherein the selecting of the resonated connection profile comprises executing of the relevance machine learning model using as input, the monitored interaction of the member with the online connection network system during the current login session.

6. The method of claim 1, comprising tracking and storing information related to interactions between the member and the member's connections in the online connection network system, wherein the data derived from the subject profile and used as input into the relevance machine learning model comprises the tracked information related to interactions between the member and the member's connections.

7. The method of claim 1, comprising tracking and storing information related to the member's connections and their respective status as subscribers to the premium service, wherein the data derived from the connected profiles and used as input into a relevance machine learning model comprises the tracked information related to the member's connections and their respective status as subscribers to the premium service.

8. The method of claim 1, comprising:
tracking and storing information related to interactions, in the online connection network system; between members of the online connection network system and their respective connections;
tracking and storing information related to behavior, in the online connection network system, of members of the online connection network system that are subscribers to the premium service; and
training the relevance machine learning model using the information related to interactions, in the online connection network system, between members of the online connection network system and their respective connections and the information related to behavior, in the online connection network system, of members of the online connection network system that are subscribers to the premium service.

9. The method of claim 1, wherein the intent information indicates job search in the online connection network system.

10. The method of claim 1, wherein the identifying of the intent information for the subject profile comprises identifying a subdomain of the intent information and wherein the resonated connection profile is characterized by the subdomain of the intent information.

11. A system comprising:
one or more processors; and
a non-transitory computer readable storage medium comprising instructions that when executed by the one or more processors cause the one or more processors to perform operations comprising:
maintaining member profiles in an online connection network system; the member profiles including a subject profile representing a member in the online connection network system; the subject profile associated with connected profiles from the member profiles;
monitoring interactions of the member with the online connection network system during a current login session of the member in the online connection network system;
based on the monitored interactions of the member with the online connection network system during the current login session, identifying intent information for the subject profile;
using the intent information, together with data derived from the subject profile, and with data derived from the connected profiles as input into a relevance machine learning model, executing the relevance machine learning model to produce a set of candidate profiles from the connected profiles, each profile from the set of candidate profiles having an associated relevance value indicating connection strength between the profile and the subject profile;
selecting from the set of candidate profiles a resonated connection profile based on the monitored interaction of the member with the online connection network system during the current login session; and
including into a user interface a reference to the selected resonated connection profile together with information about a premium service provided by the online connection network system.

12. The system of claim 11, wherein the identifying of the intent information for the subject profile comprises executing an intent machine learning model, using, as input, the monitored interactions of the member with the online connection network system during the current login session.

13. The system of claim 12, comprising:
tracking and storing activity of members in the online connection network system to generate members' behavior data; and
training the intent machine learning model using the members' behavior data.

14. The system of claim 11, comprising causing presentation of the user interface on a display device associated with the member represented by the subject profile.

15. The system of claim 11, wherein the selecting of the resonated connection profile comprises executing of the relevance machine learning model using as input, the monitored interaction of the member with the online connection network system during the current login session.

16. The system of claim 11, comprising tracking and storing information related to interactions between the member and the member's connections in the online connection network system, wherein the data derived from the subject profile and used as input into the relevance machine learning model comprises the tracked information related to interactions between the member and the member's connections.

17. The system of claim 11, comprising tracking and storing information related to the member's connections and their respective status as subscribers to the premium service, wherein the data derived from the connected profiles and used as input into a relevance machine learning model comprises the tracked information related to the member's connections and their respective status as subscribers to the premium service.

18. The system of claim 11, comprising:
tracking and storing information related to interactions, in the online connection network system; between members of the online connection network system and their respective connections;
tracking and storing information related to behavior, in the online connection network system, of members of the online connection network system that are subscribers to the premium service; and training the relevance machine learning model using the information related to interactions, in the online connection network system, between members of the online connection network system and their respective connections and the information related to behavior, in the online connection network system, of members of the online connection network system that are subscribers to the premium service.

19. The system of claim 11, wherein the intent information indicates job sears in the online connection network system.

20. A machine-readable non-transitory storage medium having instruction data executable by a machine to cause the machine to perform operations comprising:

maintaining member profiles in an online connection network system; the member profiles including a subject profile representing a member in the online connection network system, the subject profile associated with connected profiles from the member profiles;

monitoring interactions of the member with the online connection network system during a current login session of the member in the online connection network system;

based on the monitored interactions of the member with the online connection network system during the current login session, identifying intent information for the subject profile;

using the intent information, together with data derived from the subject profile, and with data derived from the connected profiles as input into a relevance machine learning model, executing the relevance machine learning model to produce a set of candidate profiles from the connected profiles, each profile from the set of candidate profiles having an associated relevance value indicating connection strength between the profile and the subject profile;

selecting from the set of candidate profiles a resonated connection profile based on the monitored interaction of the member with the online connection network system during the current login session; and including into a user interface a reference to the selected resonated connection profile together with information about a premium service provided by the online connection network system.

\* \* \* \* \*